(12) United States Patent
Falk

(10) Patent No.: US 6,761,256 B2
(45) Date of Patent: Jul. 13, 2004

(54) CLUTCH DEVICE FOR FAST DECLUTCHING OF TWO ELEMENTS IN A TRANSMISSION

(75) Inventor: Curt Falk, Hudiksvall (SE)

(73) Assignee: Voith Safeset AB, Hudiksvall (SE)

( * ) Notice: Subject to any disclaimer, the term of this patent is extended or adjusted under 35 U.S.C. 154(b) by 0 days.

(21) Appl. No.: 10/239,193

(22) PCT Filed: Mar. 30, 2001

(86) PCT No.: PCT/SE01/00654
§ 371 (c)(1),
(2), (4) Date: Sep. 27, 2002

(87) PCT Pub. No.: WO01/75321
PCT Pub. Date: Oct. 11, 2001

(65) Prior Publication Data
US 2003/0047404 A1 Mar. 13, 2003

(30) Foreign Application Priority Data
Apr. 4, 2000 (SE) .............................................. 0001255

(51) Int. Cl.[7] .............................. F16D 1/08; F16D 9/00; F16D 25/062; F16D 43/286
(52) U.S. Cl. ................. 192/56.3; 192/85 AT; 192/88 B
(58) Field of Search ............................. 192/56.3, 88 B, 192/85 AT, 150; 403/2, 5

(56) References Cited

U.S. PATENT DOCUMENTS 4,264,229 A  *  4/1981  Falk et al. ....................... 403/5
4,752,275 A  *  6/1988  Lindenthal et al. ............ 403/2
4,944,377 A      7/1990  Elsner
5,051,018 A      9/1991  Appell et al. ................... 403/5
5,407,046 A  *  4/1995  Kawasaki .................. 192/56.3
6,148,981 A  * 11/2000  Lindenthal ................. 192/56.3
6,170,627 B1 *  1/2001  Lindenthal ................. 192/56.3

FOREIGN PATENT DOCUMENTS

DE      36 38 596          5/1988
JP      3-129124 A    *    6/1991
WO      97/21044           6/1997

* cited by examiner

Primary Examiner—Rodney H. Bonck
(74) Attorney, Agent, or Firm—Jacobson Holman PLLC

(57) ABSTRACT

A clutch arrangement for rapid disengagement of two elements in a transmission system when a chosen torque is exceeded. The first element is a conical shaft end that carries a corresponding sleeve which, in turn, carries externally at its ends two mutually separated ball bearings with a force transmission ring disposed therebetween. The second element, an annular force transmission body, surrounds and is carried by the ball bearings and includes a pressurisable hydraulic chamber which, when pressurised, causes a reduction in the inner surface diameter of the body so that the body is brought into force transmitting engagement with the outer surface of the ring. The sleeve carries a dogging element which is adapted to act on an element carried by the body for depressurising the hydraulic chamber upon relative rotation between the body and the sleeve such that, when the chosen torque is exceeded resulting in the relative rotation, the chamber is depressurised, and the ring and the body pass free from each other.

10 Claims, 2 Drawing Sheets

CLUTCH DEVICE FOR FAST DECLUTCHING OF TWO ELEMENTS IN A TRANSMISSION

This is a nationalization of PCT/SE01/00654, filed Mar. 30, 2001 and published in English.

BACKGROUND OF THE INVENTION

1. Field of the Invention

The invention relates to a clutch arrangement for rapid disengagement of two elements in a transmission system when a chosen torque is exceeded. One element is a conical shaft end that carries a corresponding sleeve which, in turn, carries externally at its axial ends two mutually spaced ball bearings and a force transmission ring disposed therebetween. An annular force transmission body surrounds and is carried by the ball bearings and includes a pressurizable hydraulic chamber which when pressurized through the medium of a valve on the body, causes the diameter of the inner surface of the body to decrease so as to attain force transmitting engagement with the outer surface of the ring. The sleeve carries a dogging element which is adapted to act on an element carried by the body for relieving the hydraulic chamber of pressure upon relative rotation between the body and the sleeve. Such a clutch arrangement functions to mutually disengage two transmission components mutually connected via said clutch arrangement, at a predetermined moment in time.

2. Description of the Related Art

Clutch arrangements of this particular kind are sometimes called safety couplings and are well known from WO 97/21044 for example. Such clutches, or couplings, are often used in transmissions with which heavy loads are transmitted, for the purpose of protecting the equipment on the driving and/or on the driven side of the transmission against damage that can occur if the torque transmitted through the transmission and the clutch exceeds a threshold value. Clutches of this particular kind shall break the load transmission with the minimum of damage to the clutch or coupling itself, so that the clutch can be replaced quickly and easily and/or repaired.

However, the axial length of the space incorporated for accommodating the safety coupling is sometimes restricted. This results in special problems that must be solved, since it may otherwise be necessary to make significant changes in other parts of the transmission in which the clutch shall be fitted.

One example in this respect is that each carriage of existing express trains of a given design has an individual electrically driven motor at one end of the carriage. The output shaft of the motor is short and is coupled to a first universal joint via a long rod and a second universal joint connected thereto, to a distribution gear situated at the other end of the carriage and having two output shafts which are each connected to drive a respective wheel in a wheel pair. The transmission as such has long been tested and it is, of course, suitable to mount a clutch or coupling arrangement at a position in the transmission in which the transmission is influenced to a minimum by the inclusion of the clutch arrangement and so that the clutch arrangement is positioned conveniently with respect to fitting and removing said arrangement to and from the system. This means that in such instances the clutch will preferably be mounted between the output shaft of the motor and the universal joint proximal thereto. The problem that arises in the majority of cases is that the shaft obtains a length which is smaller than its diameter.

A further problem is that the hydraulic pressure of the clutch must be in the order of 1000 bar. The clutch typically includes a ring-shaped body that has a coaxial, cylindrical hydraulic chamber, such that the inner wall of the body will move radially inwards when the chamber is pressurised and thus obtain a reduction in diameter, wherewith the inner wall is brought into engagement with a sleeve that has a conical inner surface and that is driven up onto the conical end of the motor shaft.

When the hydraulic chamber is not pressurised, the body is able to rotate relative to the sleeve on ball bearings disposed between the body and the sleeve as there will then be a radial clearance between the body and the sleeve. The body includes a valve via which the hydraulic chamber is pressurised. The sleeve is a dogging element which upon relative rotation of the body with the sleeve functions to break-off a shear-pipe that communicates with the chamber, so as to depressurise the hydraulic chamber and thereby rapidly break the power transmission between the body and the sleeve so as to ensure minimum damage to the clutch and to the transmission elements connected thereto.

Because of the small axial space in which the clutch arrangement is housed, the hydraulic pressure must be high, e.g. 1100 bar, in order to achieve requisite torque transmission. Pressures of such high magnitudes will, of course, constitute a break-down hazard. Moreover. the difficulty in providing for comfortable fitting and removal of the body and bearings to and from the sleeve presents a problem.

SUMMARY OF THE INVENTION

The object of the present invention is therefore to provide a clutch arrangement with which high torque transmission can be achieved despite a short axial length, and that can be readily fitted and removed to and from the sleeve, and that can also operate at relatively low hydraulic pressures.

This object is achieved by the invention of a clutch arrangement for rapid disengagement of two elements in a transmission system when a chosen torque is exceeded. One element is a conical shaft end that carries a corresponding sleeve which, in turn, carries externally at its axial ends two mutually spaced ball bearings and a force transmission ring disposed therebetween. An annular force transmission body surrounds and is carried by the ball bearings and includes a pressurizable hydraulic chamber which when pressurized through the medium of a valve on the body, causes the diameter of the inner surface of the body to decrease so as to attain force transmitting engagement with the outer surface of the ring. The sleeve carries a dogging element which is adapted to act on an element carried by the body for relieving the hydraulic chamber of pressure upon relative rotation between the body and the sleeve. The ring and the body are adapted to pass free from each other when the hydraulic chamber is depressurized, the ring being connected operatively with the sleeve so that relative rotation between the clutch components takes place between the ring and the body when the clutch is triggered.

Further embodiments of the inventive clutch arrangement will be apparent from the accompanying dependent claims.

The invention resides in positioning the ball bearings beneath the axial ends of the body, and by operatively connecting to the sleeve a ring that extends up to the inner surface of the body. The ring can be connected operatively with the sleeve, by giving the mutual co-acting surfaces of the ring and the sleeve a relatively high coefficient of friction, for example by forming ridges or by applying a hard powder, e.g., tungsten carbide powder, on one of the surfaces, for instance on the inner surface of the ring. The ring will then be essentially free from the sleeve when the hydraulic chamber is depressurised and when the sleeve is withdrawn from the end of the shaft, so that the body, the ball bearings and the ring can be readily withdrawn axially from the sleeve. The sliding surfaces of the clutch arrangement, i.e. the mutually facing surfaces of the body and the ring, may be damaged as a result of frequent activation or engagement of the clutch due to exceeding a set torque, and the heavily loaded ball bearings may also be damaged as a result of unbalanced forces. It is therefore appropriate to replace such components so as to bring the clutch to an operable state.

The ring may be fixedly connected to the sleeve, the construction should then be further developed so as to enable the bearings to be dismantled by moving them towards respective axially adjacent ends of the body, wherewith the dogging element, which is suitably located axially outwards of one of the ball bearings, should be capable of being dismantled.

Alternatively. the ring may be removably connected to the sleeve via a spline connection or some other known type of connection, so as to enable the body with the ball bearings and the ring to be readily withdrawn axially from the sleeve when removed from the shaft, after having loosened the connection.

In a further variant of the invention, the dogging element may include a hub fitted to an end-part of the sleeve so as to lock onto the sleeve when said sleeve widens as it is driven onto the conical shaft end, thereby enabling the dogging element to be readily dismantled or removed when the sleeve has been withdrawn, wherewith the ball bearings can be readily removed axially towards respective adjacent ends of the sleeve, whereby the ring may be fixed to the sleeve, and whereby the sleeve and the ring constitute a replacement for restoring the clutch to an operative state.

In preferred embodiments, the respective axial ends of the hydraulic chamber are situated approximately in a plane that is normal to the clutch axis, containing centres for the balls of respective ball bearings. In this way, the end-part of the annular body will swing out so that the outer rings of the ball bearings are also twisted when the hydraulic chamber is pressurised, whereby the ball bearings are controlled and swing-in between their bearing races with no clearance or play. This avoids so-called "brinelling" otherwise caused by balls that lie in the gap between races bouncing against each other as a result of external vibrations between the bearing rings and causing microscopic damage thereto. Because a clutch. or coupling, according to the invention may be in use for a considerable time (several years) before the clutch is triggered, such vibrational damage can develop over a long period of time and significantly reduce the life-time of the ball bearings, so that they will not be operable during the short period of time that the body and the sleeve rotate relative to each other when the clutch is triggered. Because of the clearance-free clamping of the balls of the bearings, the useful life of the ball bearings is increased without needing to use ring-shaped spring elements that would encroach on the axial space required for accommodating the length of the ring in the space at disposal for the clutch arrangement.

BRIEF DESCRIPTION OF THE DRAWINGS

The invention will now be described in more detail by way of example and with reference to the accompanying drawing.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
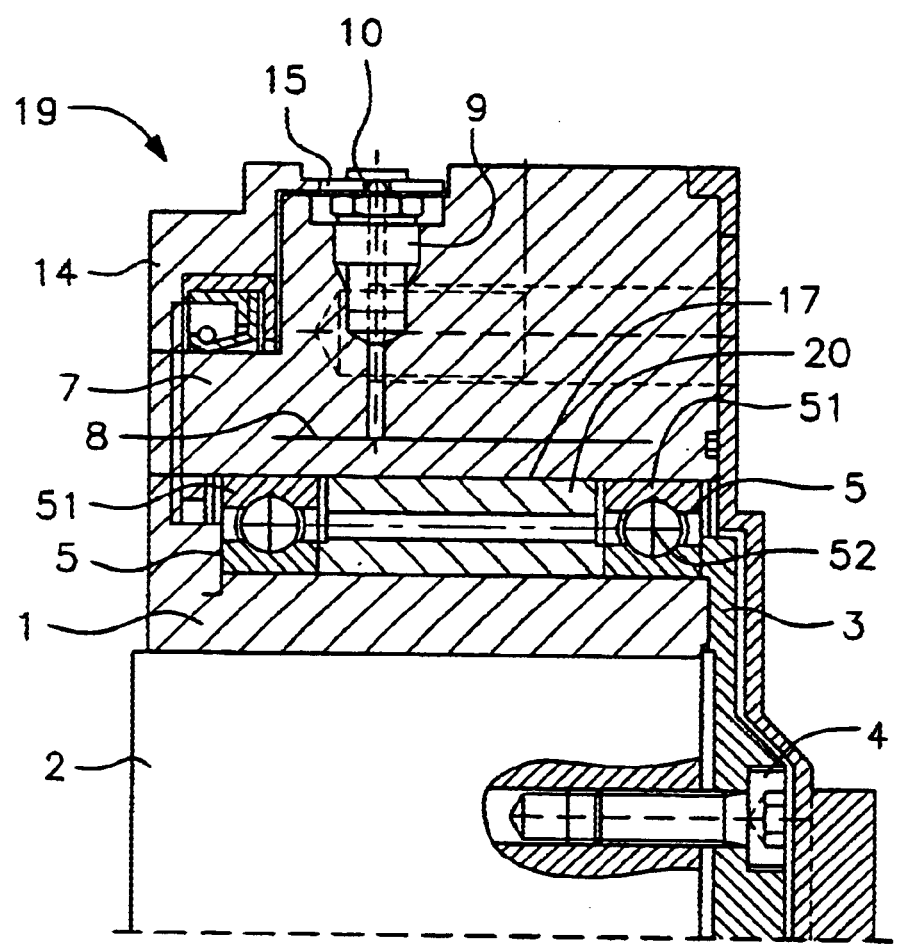
FIG. 1 is an axial sectioned view of a mounted safety coupling according to the invention.

Shown in FIG. 1 is a coupling 19 according to the present invention. The coupling 19 includes a sleeve 1 that has a conical inner surface which is driven up onto a corresponding conical outer surface of a shaft end 2. The sleeve 1 is secured by an end-plate 3 which is fixed to the free end of the shaft end 2 by means of bolts 4. The sleeve has a cylindrical outer surface which carries at its ends two axially spaced ball bearings 5 that rotatably carry an annular body 7 which contains a coaxial, cylindrical hydraulic chamber 8 in the proximity of its inner surface, which is cylindrical when the chamber is pressureless. Pressurised hydraulic fluid is delivered to the chamber 8 through the medium of a valve 9 on the body 7. The body 7 has a radially projecting shear pipe 10 which communicates with the chamber 8. The axial ends of the hydraulic chamber 8 extend to the centerpoint 52 of the ball bearings as well as over the outer rings 51 holding the bearings.

A so-called dogging element 14 is attached to the sleeve 1 and has an arm 15 which is able to strike against the pipe 10 upon relative rotation between the body 7 and the sleeve 1.

A cylindrical ring 20 extends between the bearings 5 and between the sleeve 1 and body 7. The friction between the ring 20 and the sleeve 1 is relatively high in relation to the friction between the ring 20 and the body 7 when said ring and body are in contact with one another. The inner wall 17 of the body 7, said wall being defined by the chamber 8 curves radially inwards when the chamber 8 is pressurised, e.g. with a pressure of 1000 bars, so as to achieve frictional engagement between the intermediate wall 17 and the ring 20 and also between the ring 20 and the sleeve 1.

The ring 20 is dimensioned to obtain a radial clearance of about 0.1–0.5 mm to the surface of the wall 17 when there is no pressure in the chamber 8, so that the body 7 is able to rotate freely in relation to the sleeve when the arm 15 has broken-off the shear-pipe 10, thereby relieving the hydraulic chamber of all load.

In the case of the described embodiment, the body 7 is bolted to a jointing flange on a transmission shaft (not shown) that lies in coaxial alignment with the shaft end 2.

The friction coefficients of the inner surface and the outer surface of the ring 20 in relation to the adjacent surfaces will preferably have the relationship $$\mu > (dy/di)^2 \times \mu_y$$

where dy/di are the outer diameter and inner diameter of the ring respectively.

This enables the clutch or coupling, to be readily fitted and removed/dismantled, by simply drawing the body from the sleeve and the ball bearings, subsequent to having removed the sleeve and the elements carried thereby from the shaft end. Moreover, the ball bearings and the ring can he readily withdrawn from the sleeve in one axial direction, whereby the dogging element may thus be permanently connected to one end of the sleeve 1. Alternatively the dogging element may be removably connected to the sleeve. wherewith the ring may be connected to the sleeve, either formed integrally therewith or by means of a spline joint or like means.

By arranging the slip surface at a radius corresponding to the outer diameter of the ball bearings instead of at a surface corresponding to the inner diameter of said ball bearings, it is possible to work with a much lower hydraulic pressure in the chamber (900 bar instead of 1100 bar in one practical application). This provides a higher degree of safety and/or enables the transmission of a higher torque.

In the FIG. 1 illustration, the dogging element has a hub which is firmly clamped on a cylindrical surface at one end of the sleeve. This fixation of the hub is abolished when load on the sleeve is removed for withdrawal from the shaft end so as to enable the dogging element to be readily removed, wherewith the adjacent bearing can also be removed axially from the sleeve even though the ring is connected to the hub.

Figure 2:
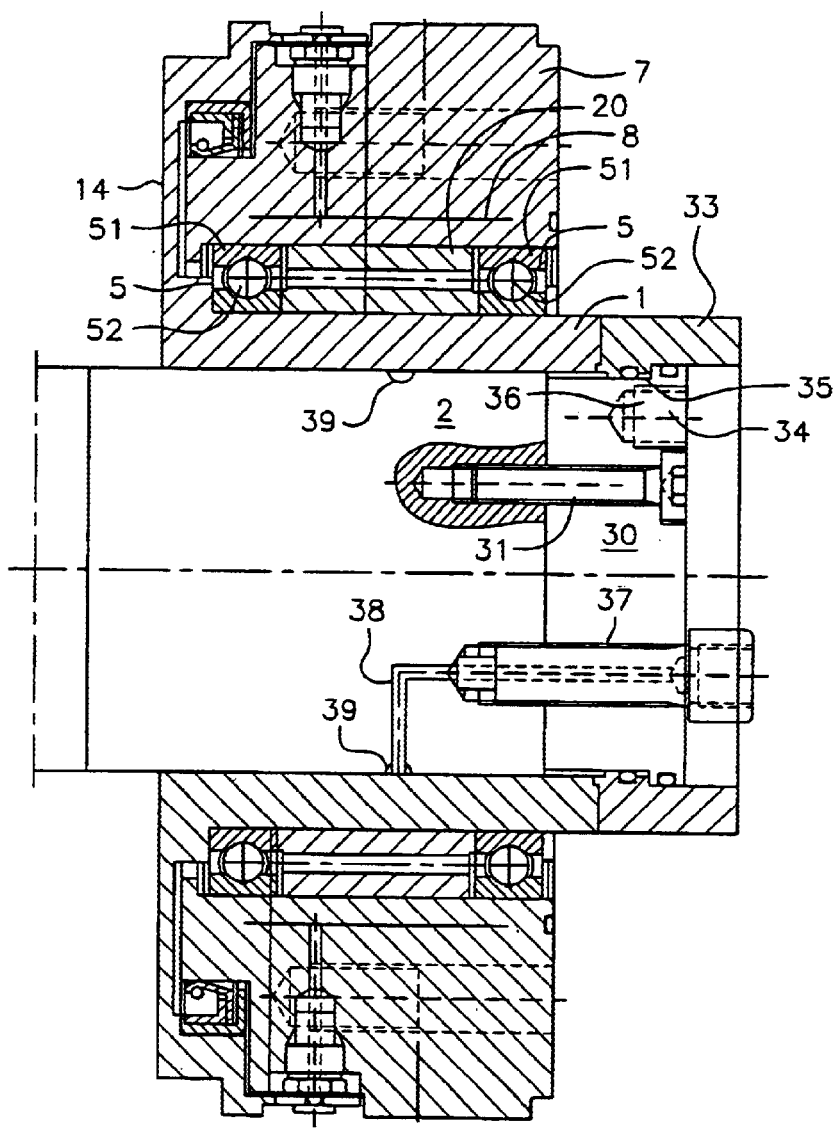
FIG. 2 is an axial sectioned view of the coupling in conjunction with fitting/removing the coupling.

FIG. 2 shows schematically that a hydraulic chamber cover 30 is screwed firmly to one end of the shaft end and that the sleeve 1 carries a cylinder ring 33 which coacts with said cover 30. Located between the cover and the cylinder wall is a ring-shaped chamber 36 which communicates via a channel 35 with a connection nipple 34 to which pressurised hydraulic fluid can be delivered for axial displacement of the cylinder ring 33 relative to the cover 30 whereby the sleeve 1 can be driven up onto the shaft end, as shown in the figure. Hydraulic pressure can be applied to an adjacent ring chamber via another connecting channel, for withdrawing the sleeve 1 from the shaft end. FIG. 2 also shows that a nipple 37 is fitted via the cover and the shaft end and connects with a supply channel 38 that opens out into a peripheral groove 39 on said shaft end. Axial displacement of the sleeve is facilitated by injecting oil into the ring groove 39 and thus into the interface between the shaft end and sleeve.

Figure 3:
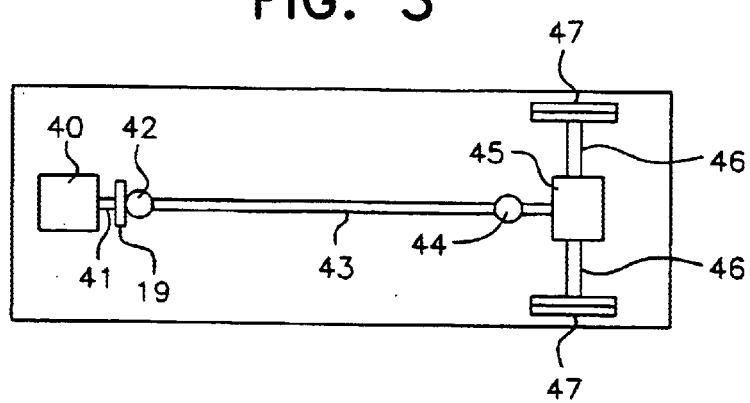
FIG. 3 illustrates schematically the position of the coupling in a transmission in a railway carriage of an express train.

FIG. 3 is a schematic view taken from beneath a railway carriage and showing its drive transmission, wherewith an electrically driven motor 40 (3600 rpm) at one end of the carriage has a short output shaft 41 which is connected to a first universal joint 42 which, in turn, is connected to a second universal joint 44 by means of a long, longitudinally extending rod 43. The second universal joint 44 is connected to a distribution gear 45 located at the other end of the carriage and having output shafts 46 connected to the driven wheel pair 47.

A clutch or coupling 19 according to the invention can be mounted at the output shaft 41 of the electric motor 40, providing that the axial length of the clutch is at most about 100 mm. One embodiment of the invention, which can be used with the application shown in FIG. 3, has a weight of 26 kg and provides torque transmission in the range of 10–20 kNm with an adjustment accuracy of +15/−10% and with a maximum hydraulic pressure of 1000 bar.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A clutch arrangement for rapid disengagement of two elements in a transmission system when a chosen torque is exceeded, comprising a conical shaft end that carries a corresponding sleeve which, in turn, carries externally at its axial ends two mutually spaced ball bearings with a force transmission ring disposed therebetween, an annular force transmission body that surrounds and is carried by said ball bearings and includes a pressurisable hydraulic chamber which, when pressurised through a valve on said body, causes an inner surface diameter of the body to decrease so as to attain force transmitting engagement with an outer surface of the ring, and said sleeve carrying a dogging element which is adapted to act on an element carried by the body for relieving the hydraulic chamber of pressure upon relative rotation between the body and the sleeve, said ring and said body being adapted to pass free from each other when the hydraulic chamber is depressurised, and said ring being connected operatively with the sleeve so that relative rotation will take place between the ring and the body when the chosen torque is exceeded.

2. The clutch arrangement according to claim 1, wherein the ring is permanently connected to the sleeve, and the dogging element is releasably connected to the sleeve.

3. The clutch arrangement according to claim 1, wherein the ring is releasably connected to the sleeve.

4. The clutch arrangement according to claim 3, wherein the ring is releasably connected to the sleeve through a medium of a friction joint that is established when pressurising the hydraulic chamber, a friction coefficient ($\mu_1$) with respect to engagement between the ring and the sleeve being related to a friction coefficient ($\mu_y$) with respect to engagement between the ring and the body according to the relationship $\mu_1 \geq (dy/di)^2 \times \mu_y$, where dy is an outer diameter of the ring and di is an inner diameter of said ring.

5. The clutch arrangement according to claim 1, wherein the axial ends of the hydraulic chamber extend to overlie a centerpoint of said ball bearings and outer rings holding said ball bearings, such that a wall of the hydraulic chamber proximal to the ring clamps the outer rings into playless contact with the bearing balls in the pressurised state of the hydraulic chamber.

6. A clutch arrangement for rapid disengagement of two elements in a transmission system when a chosen torque is exceeded, comprising a shaft end that carries a corresponding sleeve which, in turn, carries externally at its axial ends two mutually spaced ball bearings with a force transmission ring disposed therebetween, an annular force transmission body that surrounds and is carried by said ball bearings and includes a pressurisable hydraulic chamber which, when pressurised, causes an inner surface diameter of the body to decrease so as to attain force transmitting engagement with an outer surface of the ring, said hydraulic chamber, when depressurised, allowing said ring and said body to pass free from each other so that relative rotation will take place between the ring and the body when the chosen torque is exceeded.

7. The clutch arrangement according to claim 6, wherein the ring is permanently connected to the sleeve.

8. The clutch arrangement according to claim 6, wherein the ring is releasably connected to the sleeve.

9. The clutch arrangement according to claim 8, wherein the ring is releasably connected to the sleeve through a medium of a friction joint that is established when pressurising the hydraulic chamber, a friction coefficient ($\mu_1$) with respect to engagement between the ring and the sleeve being related to a friction coefficient ($\mu_y$) with respect to engagement between the ring and the body according to the relationship $\mu_1 > (dy/di)^2 \times \mu_y$, where dy is an outer diameter of the ring and di is an inner diameter of said ring.

10. The clutch arrangement according to claim 6, wherein the axial ends of the hydraulic chamber extend to overlie a centerpoint of said ball bearings and outer rings holding said ball bearings, such that a wall of the hydraulic chamber proximal to the ring clamps the outer rings into playless contact with the bearing balls in the pressurised state of the hydraulic chamber.

* * * * *